US006587972B1

(12) United States Patent
Baird et al.

(10) Patent No.: US 6,587,972 B1
(45) Date of Patent: Jul. 1, 2003

(54) SYSTEM AND METHODS FOR CREATING AND USING CUSTOMIZED SELF-TEST PAGES

(75) Inventors: Roger T. Baird, Boise, ID (US); Timothy P. Blair, Boise, ID (US)

(73) Assignee: Hewlett-Packard Development Company, Houston, TX (US)

( * ) Notice: Subject to any disclaimer, the term of this patent is extended or adjusted under 35 U.S.C. 154(b) by 42 days.

(21) Appl. No.: 10/046,110

(22) Filed: Jan. 11, 2002

(51) Int. Cl.⁷ ................................................ H02H 3/05
(52) U.S. Cl. ......................... 714/48; 235/436; 399/79; 364/550; 355/200
(58) Field of Search ...................... 235/436; 714/48; 399/79; 364/550; 355/200

(56) References Cited

U.S. PATENT DOCUMENTS

| | | | | |
|---|---|---|---|---|
| 4,586,147 A | * | 4/1986 | Tadokoro | 702/184 |
| 5,491,540 A | * | 2/1996 | Hirst | 399/12 |
| 6,052,547 A | * | 4/2000 | Cuzzo et al. | 399/79 |
| 6,317,848 B1 | * | 11/2001 | Sorens et al. | 714/48 |

* cited by examiner

Primary Examiner—Thien M. Le
Assistant Examiner—Daniel A. Hess

(57) ABSTRACT

The system and methods described herein relate to printing usage information for managed printing devices in a uniform manner on customized self-test pages and using the customized self-test pages for automatic data entry of the usage information. A formatting device accesses and formats usage information from a printing device and creates a print job containing the formatted usage information in a customized self-test page. Formatted usage information printed on a customized self-test page is readily scanned and optically recognized for automatic entry into an accounting system. Automatic entry of usage information reduces labor hours and costs associated with managing fleets of printing devices.

25 Claims, 4 Drawing Sheets

SYSTEM AND METHODS FOR CREATING AND USING CUSTOMIZED SELF-TEST PAGES

TECHNICAL FIELD

The present disclosure relates to printing self-test pages, and more particularly, to printing customized self-test pages formatted in a uniform manner across various printing devices for use in an automated data-entry process.

BACKGROUND

Printing is a critical business function for many companies. Larger companies in particular usually have a need for a wide variety of printed or hardcopy output. Maintaining the diverse inventory of printers and printer-related products necessary to meet such printing needs can involve significant expenditures in both employee time and money. Therefore, companies that do not want to manage all aspects of their printing needs often contract with outside vendors that provide printing services tailored to the specific needs of the company. Typical agreements between printing-service vendors and customers involve the lease of a fleet of printers. The printing-service vendors usually agree to manage and maintain the printer fleet for the duration of the lease.

Printing-service agreements are often billed on a usage basis such as a certain fee for each printed page. The agreements typically include adjustments to the amount billed per-page based on factors such as the type of page printed, the type of print medium used, the type of printing device involved and the like. For example, the agreement may specify a higher billing rate for a legal sized page than for a letter sized page based on the likelihood that the legal sized page will require more consumable printing items such as toner. Similarly, color documents may be billed at a higher rate than black and white documents, and photo-quality print media may be billed at a higher rate than normal paper media.

Accordingly, for each billing period a printing-service vendor must gather detailed usage information from every printing device in a leased printer fleet in order to properly account for the services that have been provided to the customer for the period. The usage information is entered into the vendor's accounting system and manipulated based on the terms of the agreement in order to generate a bill for the customer.

Currently, the primary method of transferring usage information from each printing device in a printer fleet to a vendor's accounting system is very inefficient. The method involves accessing each printer device and retrieving a standardized self-test page. When all the self-test pages are retrieved, the information from each page is manually entered into the vendor accounting system. Because the format of each self-test page is based on the specific design of the printing device from which it came, the variation in pages is as great as the variation in printing devices within a printer fleet. Therefore, the manual task of discerning the proper information from each self-test page and entering it into the accounting system can be tedious and expensive.

One method of automatically entering printer usage information from self-test pages into a vendor accounting system is to scan the pages and process the information on a computer with optical character recognition software. However, the significant variation found in the formats of self-test pages makes this method of automatic data entry unreliable. Many of the font types and font sizes encountered on the various self-test pages do not lend themselves favorably to optical character recognition. Therefore, numerous errors can occur when processing groups of self-test pages, and the task of manually locating and correcting these errors is difficult and time consuming. Thus, most vendors stick with the method of manually entering printer usage data from self-test pages into their accounting systems.

Accordingly, the need exists for a way to easily and automatically enter printer usage information from self-test pages into a printing-service vendor's accounting system.

SUMMARY

A formatting device accesses and formats usage information collected by a printing device and outputs a print job to the printing device to be printed as a customized self-test page. Formatted usage information on the customized self-test page can be scanned and automatically entered into an accounting system using optical character recognition software executing on a computer.

In an exemplary embodiment, an operator establishes a temporary communication interface between a hand-held formatting device and a printing device. The formatting device queries the printing device to determine the model number of the printing device and to access information about the past usage of the printing device. The formatting device receives and formats usage information based on known characteristics of the identified printing device. Formatting includes setting font types and font sizes for the usage information that are familiar to the identified printing device. A print job is created that contains the formatted usage information incorporated into a customized self-test page. The formatting device sends the print job to the printing device which outputs the print job as a customized self-test page that presents the formatted usage information.

In another embodiment, formatting the usage information includes configuring the usage information in a bar-code format. Bar-coded usage information is incorporated into a customized self-test page that is printed by the printing device and readily scanned and entered into an accounting system.

BRIEF DESCRIPTION OF THE DRAWINGS

The same reference numbers are used throughout the drawings to reference like components and features.

DETAILED DESCRIPTION

The system and methods described herein relate to printing usage information for managed printing devices in a uniform manner on customized self-test pages and using the customized self-test pages for automatic data entry of the usage information. A formatting device accesses and formats usage information from a printing device and creates a print job containing the formatted usage information in a customized self-test page. Formatted usage information printed on a customized self-test page is readily scanned and optically recognized for automatic entry into an accounting system. Automatic entry of usage information reduces labor hours and costs associated with managing fleets of printing devices.

Exemplary System for Creating and Using a Customized Self-Test Page

Figure 1:
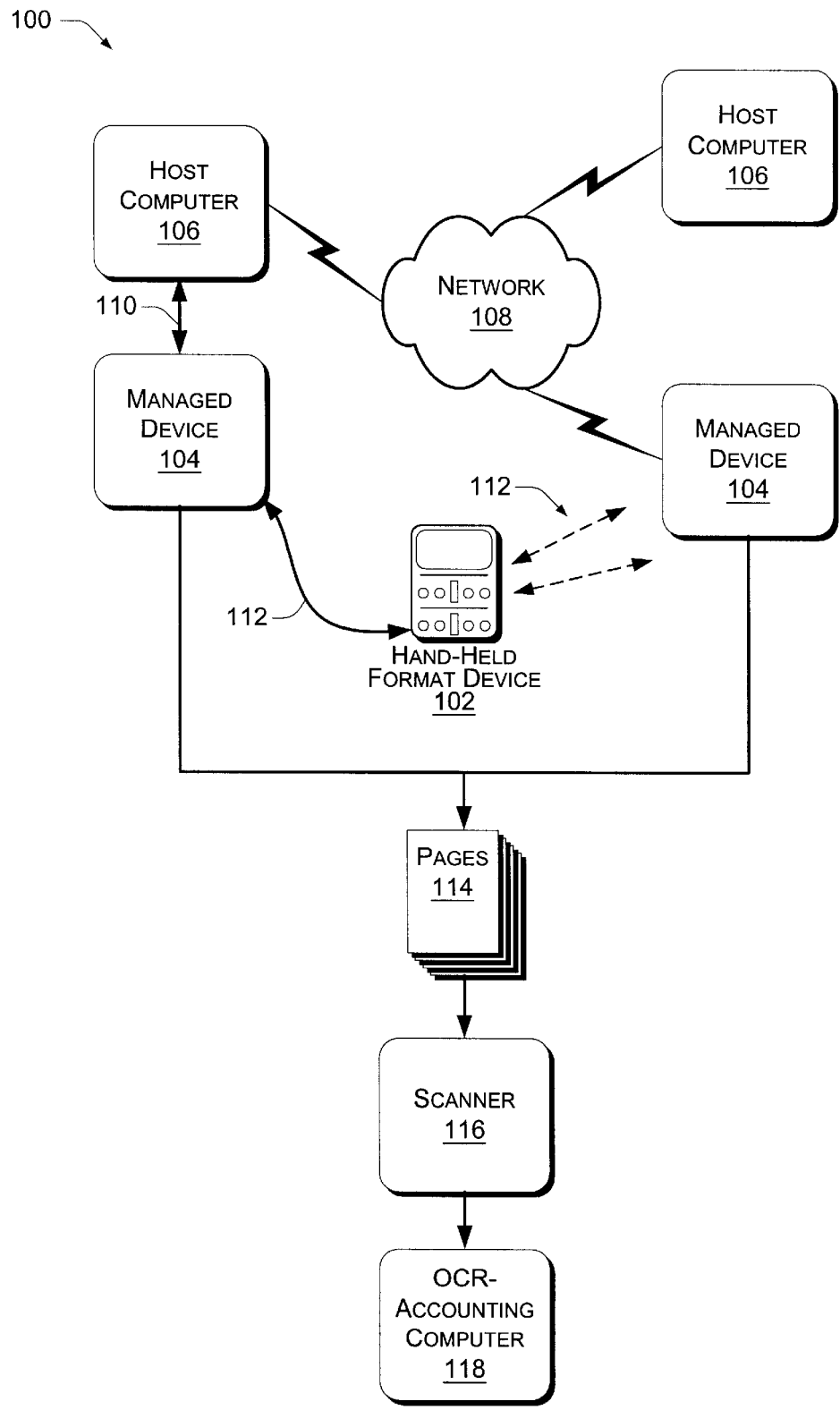
FIG. 1 illustrates a formatting device in a system environment suitable for printing and using a customized self-test page from a managed printing device.

FIG. 1 illustrates an example of a system environment 100 suitable for the creation and use of customized self-test pages from managed printing devices. The system 100 includes a formatting device 102 and one or more managed printing devices 104 operatively coupled to one or more host computers 106 through a communication link such as network 108 or printer cable 110. Network 108 can include, for example, a printer cable, a LAN (local area network), a WAN (wide area networks), an intranet, the Internet, or any other suitable communication link. Formatting device 102 is typically a hand-held, portable device that can be operatively coupled to a managed printing device 104 through various communication links 112 such as an infrared data link (i.e., two-way wireless data communications by means of infrared light), a parallel bi-directional universal serial bus (USB), a serial interface bus or any other suitable interface known in the art.

Exemplary system 100 additionally illustrates customized self-test pages 114 generated by managed printing devices 104 and a scanner 116 for scanning the self-test pages 114. Scanner 116 is typically a sheet-feed type scanner capable of scanning numerous pages, one after another. Scanner 116 is coupled to an OCR (optical character recognition) and accounting computer 118. OCR/accounting computer 118 is configured to recognize optically scanned characters from customized self-test pages 114 and enter the characters into an executable accounting process residing on the computer 118.

Within the exemplary system 100, host computer 106 and OCR/accounting computer 118 can be implemented as a variety of general purpose computing devices including, for example, a personal computer (PC), a server, a Web server, and other devices configured to communicate respectively with managed printing device 104 and scanner 116. Generally, computer devices 106 and 118 process computer-executable instructions in the form of program modules that include routines, programs, objects, components, data structures and the like.

Host computer 106 typically provides a user with the ability to manipulate or otherwise prepare in electronic form, an image or document to be rendered as an image that is printed or otherwise formed onto a print medium by managed device 104 after transmission over a communication link such as network 108. In general, host computer 106 outputs host data to managed printing device 104 in a driver format suitable for the device 104, such as PCL or PostScript. Managed printing device 104 converts the host data and outputs it onto an appropriate recording media, such as paper or transparencies.

Figure 2:
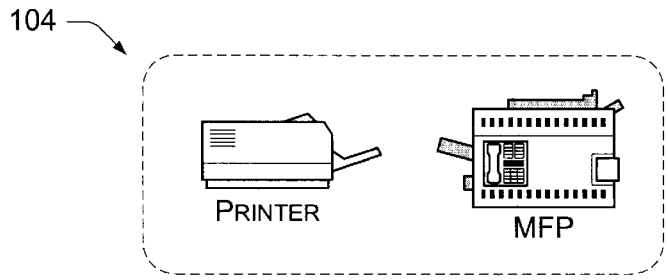
FIG. 2 illustrates managed printing devices suitable for use in the system environment of FIG. 1.

FIG. 2 illustrates examples of managed printing devices 104. Managed devices 104 can include various printing devices such as a laser printer, an inkjet printer, a dot matrix printer, a dry medium printer, a plotter and the like. In addition, managed devices 104 can include various multi-function peripheral (MFP) devices that combine a printing function with other functions such as faxing, scanning, copying and the like.

Managed devices 104 typically represent a fleet of printing devices owned and maintained by a printing-service vendor that has leased the fleet to a company under a printing-service agreement. Such agreements often include the lease, maintenance, and management of a printer fleet in exchange for payment that is determined on a usage basis. Thus, printing-service vendors periodically gather usage data from each printing device 104 in the leased fleet and enter the data into an accounting system that generates a customer bill based on the terms of the printing-service agreement.

Accordingly, formatting device 102 is generally configured to communicate with managed printing device 104, gather usage information, format the usage information, and send a print job to the managed printing device 104 for printing as a customized self-test page 114 containing the formatted usage information. Customized self-test pages 114 can be scanned by a scanner 116 so that OCR/accounting computer 118 can recognize the usage information and automatically enter it into an accounting process to generate a customer bill.

Figure 3:
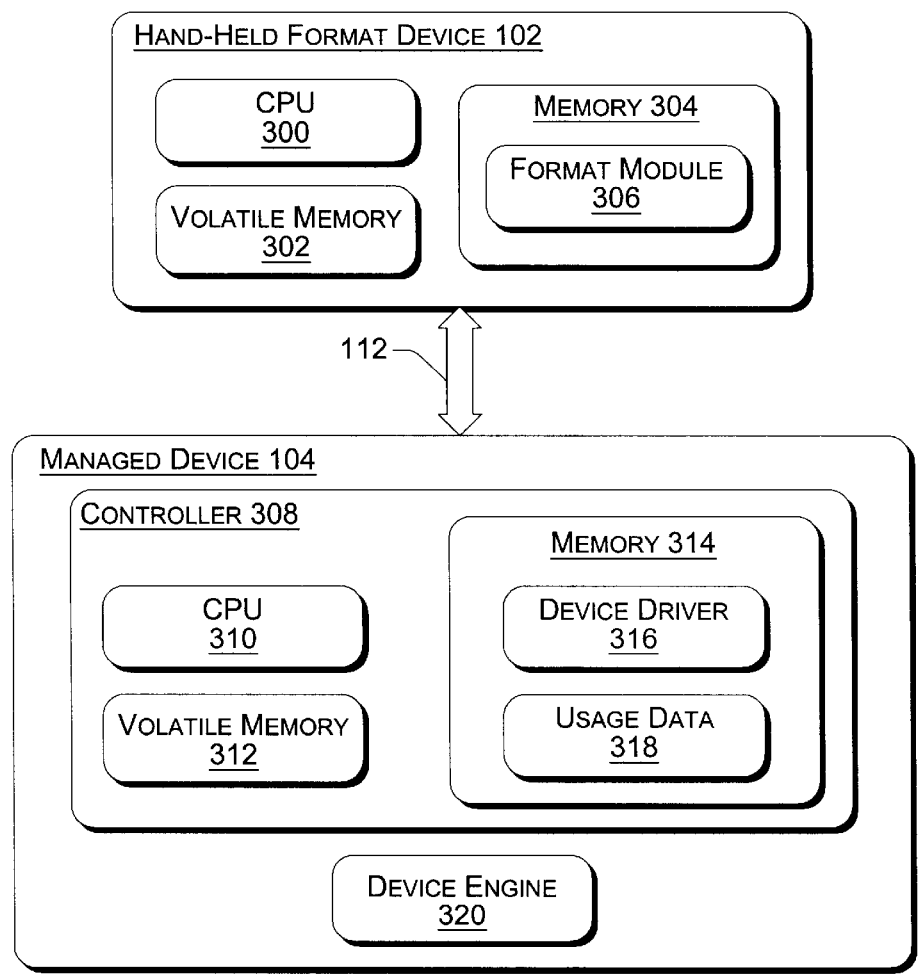
FIG. 3 is a block diagram illustrating in greater detail, a formatting device and managed printing device such as those shown in FIG. 1.

Exemplary Embodiment of a System for Creating and Using a Customized Self-Test Page FIG. 3 illustrates additional details of an exemplary embodiment of the formatting device 102 and managed device 104 shown in system 100 of FIG. 1. Managed device 104 is embodied as a printer operatively coupled to formatting device 102. Managed device 104 includes a controller 308 for processing data from host computer device 106 and formatting device 102. The controller 308 typically includes a data processing unit or CPU(s) 310, a volatile memory 312 (i.e., RAM), and a nonvolatile memory 314. Nonvolatile memory 314 can include various computer storage media such as ROM, flash memory, a hard disk, a removable floppy disk, a removable optical disk and the like. Nonvolatile memory 314 generally provides storage of computer readable instructions, data structures, program modules and other data for managed device 104. Memory 314 includes a device driver module 316 and usage data 318 that is accumulated over time by controller 308 as managed device 104 performs various printing functions.

Managed printing device 104 also includes a printer device engine 320 that performs the actual printing of a document or forming of an image onto a print medium. Controller 308 generally processes image/document data received as a print job from host computer device 106 or formatting device 102 and manages printing device 104 functions by controlling engine 320.

Formatting device 102 includes a data processing unit or CPU 300, a volatile memory 302 (i.e., RAM), and a nonvolatile memory 304. Nonvolatile memory 304 includes format module 306 and is generally configurable in a manner similar to the nonvolatile memory 314 in managed device 104 discussed above. Volatile memory 302 generally provides temporary storage of program modules and data that are in current use by CPU 300. In the exemplary embodiment of formatting device 102, volatile memory 302 provides temporary storage of executable instructions from format module 306 and usage data 318 received from managed device 104 as discussed below.

Format module 306 is configured to communicate with managed device 104 via communication interface 112.

When formatting device 102 is appropriately activated (e.g., by pressing a button on device 102), format module 306 initiates a data transfer process between managed device 104 and formatting device 102. The process begins with a query from formatting device 102 to managed device 104 requesting identification information. The query is made in a device management language such as PML (printer management-information-base language). Generally, PML is a protocol for monitoring and controlling printer devices and their functions. PML is a subset language of SNMP (simple network management protocol) that defines printer device objects with decimal-separated strings that are used in command queries, for example, to obtain object values. Thus, upon receiving a PML query for identification information, managed device 104 responds by sending its model number or some other device identifier to formatting device 102.

Based on the identification information received from managed device 104, format module 306 requests (e.g., through a PML query) various information/data from device 104 related to usage of the device 104. The usage information is typically cumulative data, but it may also be data gathered over a specified time period, such as the previous month. The usage information typically includes data detailing the number of pages that have been printed, the types of pages that have been printed and so on. For example, a particular type of managed device 104 may be able to print various-sized documents such as letter-sized, legal-sized and A4-sized documents. It may additionally be able to print high quality color documents on high quality photographic paper. Therefore, format module 306 would likely request information indicating how many documents of each type have been printed. Managed device 104 responds to the request by transferring the usage information/data 318 over communication interface 112 to formatting device 102.

Formatting device 102 receives usage data 318 and stores it in volatile memory 302. Format module 306 is configured to format the character data (i.e., text and numbers) using various pre-programmed font types and font sizes. The font types and sizes used in the formatting are typically those, that when printed on a print medium, are readily scanned and recognizable by currently available OCR (optical character recognition) software executing on a computer such as OCR/accounting computer 118.

In an alternate embodiment, format module 306 is configured to format the usage data characters as a barcode. A barcode is a pattern of bars and spaces that represent various types of data. The use of barcodes to store data as machine-readable symbols is well-known to those skilled in the art of printed embedded data technologies. Thus, usage data formatted as a barcode is also readily scanned and recognizable by currently available barcode decoding software that is executable on OCR/accounting computer 118.

In addition to formatting character fonts (or barcodes) for the usage data, the format module 306 incorporates the formatted usage data into a customized document. The format module 306 creates a print job containing the customized document and sends the print job to the managed device 104 for printing. The print job is configured in a page description language such as PCL (printer control language) or PostScript depending on the managed device 104 requirements. The managed printing device 104 receives the print job and prints the customized document containing the formatted usage data as a customized self-test page for the device 104.

Exemplary Method for Creating and Using a Customized Self-Test Page

An example method for creating and using a customized self-test page will now be described with primary reference to FIGS. 4 and 5. The method applies generally to system 100 of FIG. 1 and the formatting device 102 and managed device 104 within the system 100 as described above with respect to FIG. 3.

Figure 4:
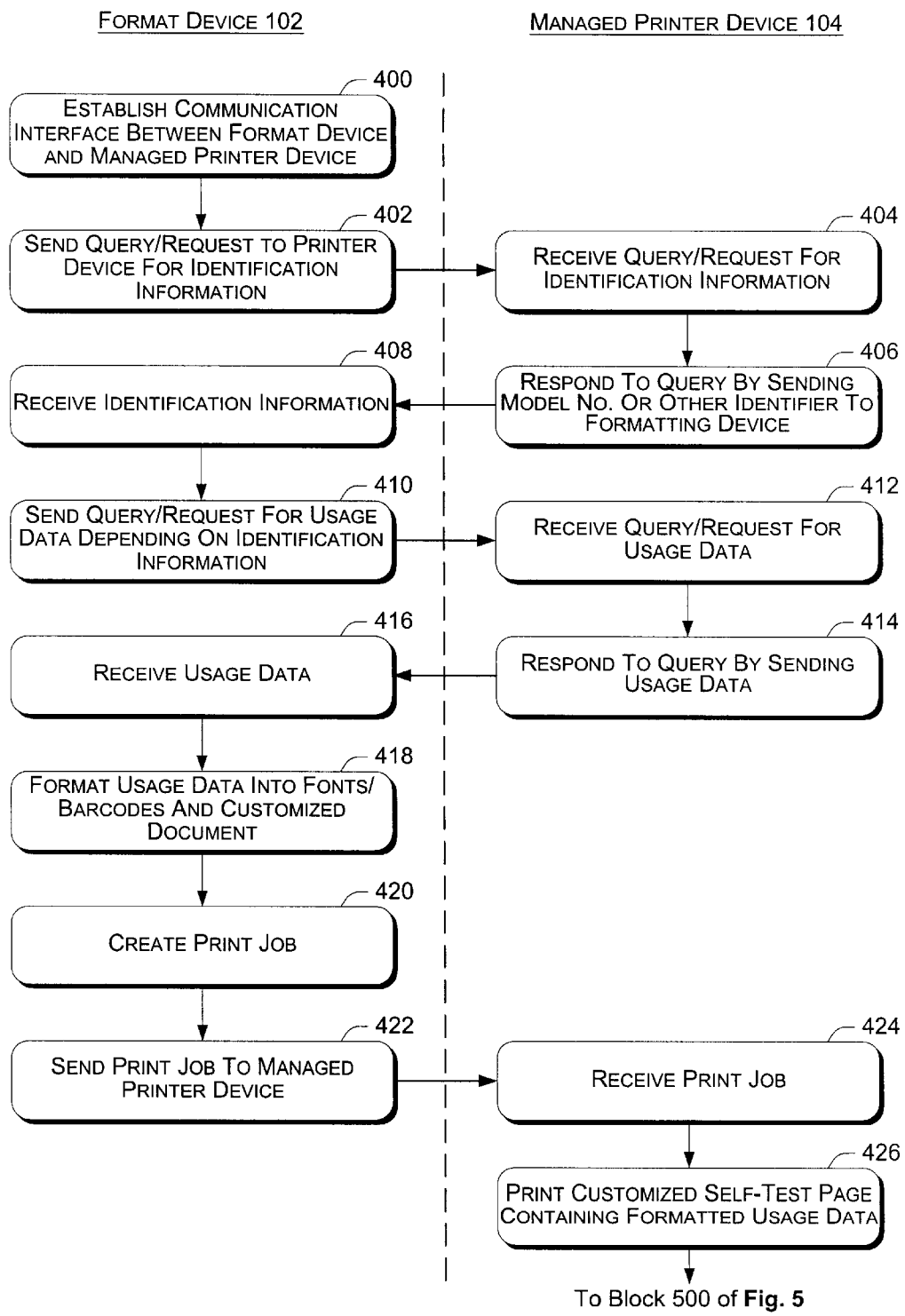
FIG. 4 is a flow diagram illustrating an example method of printing and using a customized self-test page.
Figure 5:
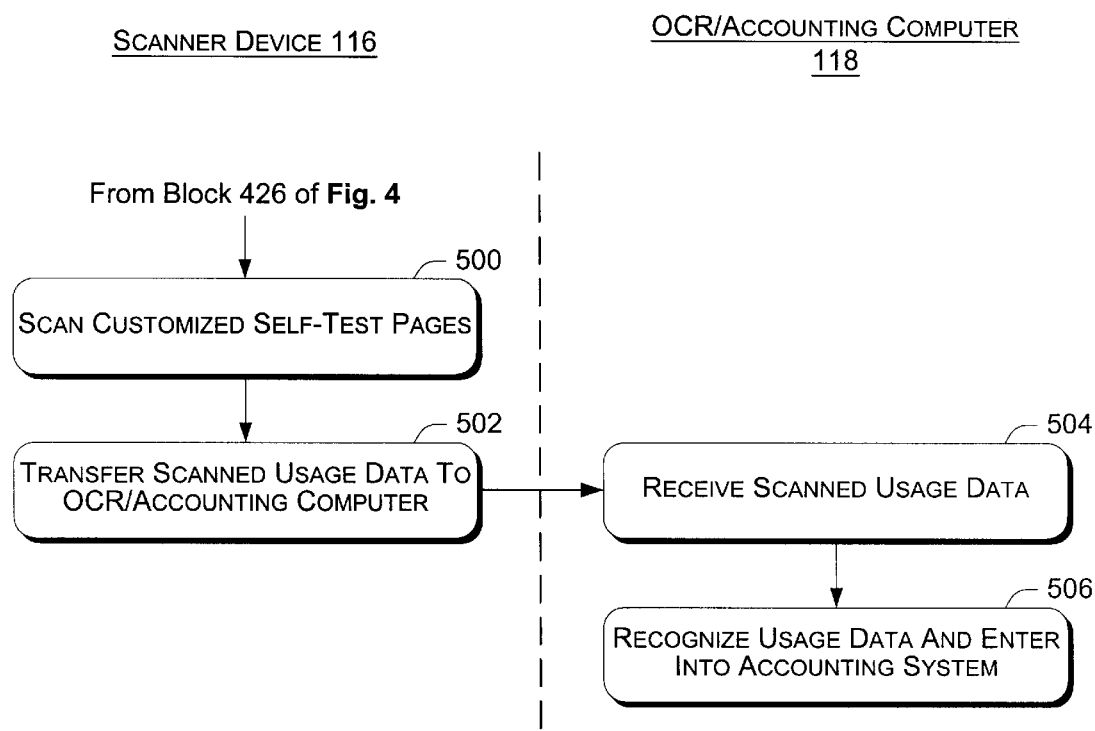
FIG. 5 is a continuation of the flow diagram of FIG. 4 illustrating an example method of printing and using a customized self-test page.

FIGS. 4 and 5 are flow diagrams that show an example of a general method for creating and using a customized self-test page. FIG. 5 is a continuation of the flow diagram of FIG. 4. At block 400 of FIG. 4, a communication interface 112 is established between a formatting device 102 and managed device 104. Typically, an operator wanting to access information from various managed devices 104 walks around with a hand-held formatting device 102 and creates a communication interface 112 by establishing an infrared data link or plugging in an interface bus between the formatting device 102 and managed device 104.

At block 402, a query is sent from the formatting device 102 requesting identification information. The managed device 104 receives the query at block 404 and responds by sending appropriate identification information back to the formatting device 102 at block 406. The formatting device 102 receives the identification information at block 408 and based on that identification information, sends additional queries for usage data at block 410. The managed device 104 receives the query at block 404 and responds by sending appropriate usage information back to the formatting device 102 at block 414.

Once the formatting device 102 has the appropriate usage data from managed device 104, it formats the usage data at block 418. Formatting the data includes setting font types and font sizes for the usage data characters and incorporating the usage data into a customized page layout. Formatting the data might also include configuring the usage data as barcode data and incorporating the barcoded data into a customized page layout.

At block 420 the formatting device 102 creates a print job containing the formatted data in the customized layout, and at block 422 the print job is sent to the managed device 104. The managed device 104 receives the print job at block 424 and prints a customized self-test page 114 containing the formatted usage data at block 426. The example method of FIG. 4 is typically repeated as many times as there are managed devices 104 in a vendor's managed fleet of printing devices. Therefore, after the printing operation at block 426, there are typically a number of customized self-test pages 114.

The method continues at block 500 of FIG. 5, where the customized self-test pages 114 are scanned by a scanner 116. At block 502, the scanned data is transferred to a computer such as OCR/accounting computer 118. OCR/accounting computer 118 receives the scanned data at block 504 and executes optical character recognition software to recognize the characters of the usage data. OCR/accounting computer 118 might also execute barcode recognition software if the usage data has been stored on the customized self-test pages 114 in barcode format. Once the usage data is recognized, it is entered into an accounting system on OCR/accounting computer 118 where it is used for various purposes, including generating a customer bill.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A method of creating a customized self-test page comprising:
   receiving usage data from a printing device;
   formatting the usage data into a customized self-test page; and
   transmitting the customized self-test page to the printing device.

2. A method as recited in claim 1, further comprising printing the customized self-test page.

3. A method as recited in claim 1, wherein the receiving further comprises:
   querying the printing device for identification information;
   receiving the identification information from the printing device; and
   based on the identification information, instructing the printing device to send the usage data.

4. A method as recited in claim 3, wherein the querying and the instructing comprise sending PML (printer management-information-base language) command strings to the printing device.

5. A method as recited in claim 1, wherein the formatting further comprises:
   setting font types and font sizes for the usage data; and
   incorporating the usage data into the customized self-test page.

6. A method as recited in claim 1, wherein the formatting further comprises:
   configuring the usage data as barcode data; and
   incorporating the barcode data into the customized self-test page.

7. A method as recited in claim 1, wherein the formatting further comprises creating a print job in a page description language appropriate for the printing device, the print job containing the customized self-test page.

8. A method as recited in claim 7, wherein the page description language is a language selected from a group of languages comprising:
   PostScript; and
   printer control language (PCL).

9. A method as recited in claim 1, further comprising, before the receiving, establishing a communication interface with the printing device.

10. A method as recited in claim 9, wherein the communication interface is selected from a group of interfaces comprising:
    an infrared link;
    a parallel bi-directional universal serial bus; and
    a serial interface bus.

11. A computer-readable medium comprising computer executable instructions configured to cause a computer to perform the method of claim 1.

12. A method of printing a customized self-test page comprising:
    transferring usage data from a printing device;
    receiving formatted usage data at the printing device; and
    printing the formatted usage data as a customized self-test page.

13. A method as recited in claim 12, wherein the transferring further comprises:
    answering a query to identify the printing device; and
    receiving an instruction to transmit the usage data.

14. A method of automatically entering printer usage data into an accounting system comprising:
    receiving usage data from a printing device;
    formatting the usage data;
    transmitting formatted usage data to the printing device;
    printing the formatted usage data as a customized self-test page;
    scanning the customized self-test page; and
    optically recognizing characters on the customized self-test page.

15. A method as recited in claim 14, wherein the receiving further comprises:
    interfacing the printing device; and
    initiating a data transfer process.

16. A method as recited in claim 15, wherein the initiating further comprises:
    requesting identification information from the printing device; and
    instructing the printing device to transfer the usage data based on the identification information.

17. A method as recited in claim 16, wherein the requesting and the instructing further comprise sending PML (printer management-information-base language) command strings to the printing device.

18. A formatting device comprising:
    a processor;
    a memory; and
    a formatting module stored in the memory and executable on the processor to receive usage data from a printing device, format the usage data, and transfer a print job configured with formatted usage data back to the printing device.

19. A formatting device as recited in claim 18, further comprising a communication interface configured to transfer data between the formatting device and the printing device.

20. A formatting device as recited in claim 19, wherein the communication interface is selected from a group of interfaces comprising:
    an infrared link;
    a parallel bi-directional universal serial bus; and
    a serial interface bus.

21. A formatting device as recited in claim 18, wherein the formatting device is a hand-held device.

22. A system comprising:
    a printing device; and
    a format device configured to receive usage data from the printing device, format the usage data, and transfer a print job configured with formatted usage data back to the printing device.

23. A system as recited in claim 22, further comprising a customized self-test page having the formatted usage data printed thereon, the customized self-test page printed by the printing device from the print job.

24. A system as recited in claim 23, further comprising:
    a scanner configured to scan the customized self-test page; and
    a computer device configured to optically recognize characters from the customized self-test page, the characters representing the usage data.

25. A system as recited in claim 24, wherein the computer device is further configured to manipulate the characters and generate a bill based on the usage data.

* * * * *